United States Patent [19]

Oka et al.

[11] Patent Number: 5,186,204

[45] Date of Patent: Feb. 16, 1993

[54] LINEAR SOLENOID VALVE APPARATUS

[75] Inventors: Takeya Oka, Nagoya; Masao Saito, Nishio; Nobuaki Miki, Kariya; Kazunori Ishikawa, Toyota; Kunihiro Iwatsuki, Toyota; Hideaki Otsubo, Toyota; Yasuo Hojo, Nagoya; Norimi Asahara, Aichi, all of Japan

[73] Assignees: Aisin AW Co., Ltd.; Toyota Jidosha Kabushiki Kaisha, both of Japan

[21] Appl. No.: 786,816

[22] Filed: Nov. 5, 1991

[30] Foreign Application Priority Data

Nov. 5, 1990 [JP] Japan .................................. 2-300359

[51] Int. Cl.⁵ .......................................... F15B 13/044
[52] U.S. Cl. ................................. 137/238; 137/625.65
[58] Field of Search ........................ 137/238, 625.65

[56] References Cited

U.S. PATENT DOCUMENTS 4,651,776 3/1987 Nakano et al. ................. 137/625.69
4,971,116 11/1990 Suzuki et al. ................... 137/625.65
5,031,656 7/1991 Benford et al. ..................... 137/238

FOREIGN PATENT DOCUMENTS 1-242884 9/1989 Japan ............................. 137/625.65
2-31062 2/1990 Japan .

Primary Examiner—Gerald A. Michalsky
Attorney, Agent, or Firm—Lorusso & Loud

[57] ABSTRACT

A linear solenoid valve apparatus for discharging foreign matter collected at the exhaust port by engaging the electromagnet of the linear solenoid valve. The apparatus includes a linear solenoid valve having a valve sleeve, a spool, a spring, and an electromagnet, and a modulator valve including an exhaust port in which foreign matter is collected. The electromagnet is energized by foreign matter discharging control, responsive to detection of lack of need for output pressure from the solenoid valve, so that the foreign matter is discharged from the exhaust port.

4 Claims, 6 Drawing Sheets

LINEAR SOLENOID VALVE APPARATUS

BACKGROUND OF THE INVENTION

1. Field of the Invention

This invention relates to a linear solenoid valve apparatus for changing an output pressure in accordance with an electric signal, and in particular, relates to a linear solenoid valve used for a vehicle hydraulic fluid control device, more particularly, a device for preventing foreign matter from causing valve sticking.

2. Description of the Prior Art

A linear solenoid valve includes a modulator valve and an electromagnetic valve.

The electromagnetic valve has a plunger operated responsive to electric current.

The modulator valve has a spool, a spring biasing the spool, and a feedback chamber, wherein a supply pressure regulated by the modulator valve is supplied from a supply port to an output port, through positioning the spool by balancing with electric energization, spring force and feedback pressure.

Linear solenoid valves used for a vehicle are classified as either the open type in which the exhaust port of the modulator valve is normally open or the closed type in which the port is normally closed.

Furthermore, the closed type is classified as either an underlapped type which connects an output port to both a supply port and an exhaust port, and an Overlapped type which does not connect the output port to either of them.

Since, in the underlapped type, the output port is always connected to the supply port and the exhaust port during regulating an oil pressure, the consumption of the oil is increased and the stability of the oil pressure is lost. It is undesirable to use a linear pressure control device when it is required to provide steady control continuously because of several problems relating to the capacity of the oil pump and the stability of line pressure.

So, in general, the overlapped type linear solenoid valve is preferred for the above described hydraulic control device.

SUMMARY OF THE INVENTION

The object of the present invention is to improve the reliability of a linear solenoid valve by keeping the oil fluid pressure and oil consumption stable and preventing the valve spool from sticking.

The linear solenoid valve apparatus of the present invention includes a linear solenoid valve including a valve sleeve, which has a supply port, an output port, and an exhaust port, and a feedback chamber, a spool slidably disposed in the valve sleeve, a spring biasing the spool, an electromagnet, and a control means for supplying electric signals to the electromagnetic valve. The linear solenoid valve is the overlapped type. The control means includes deciding means for deciding the need for an output pressure, and foreign matter discharging control means for sending a fixed electric signal to open the exhaust port wide.

In the usual condition of the linear solenoid valve, a fixed electric signal is supplied to the electromagnet from the control means to balance the spool at a fixed position and regulate the oil output pressure from the output port.

For example, as shown in FIG. 6, the linear solenoid valve of the present invention keeps an output port disconnected from the supply port 15, and even when maximum electric current is supplied to the electromagnetic valve 3, the output port is only slightly open to the exhaust port 12. That is, even when the linear solenoid valve is supplying the lowest output pressure, the opening C provided between the exhaust port and the spool 6 is extremely small. Thus, foreign matter such as steel powder mixed in the oil, is not exhausted through the opening C but collected in it. Thus, though the output port is connected to the exhaust port to a limited extent for a short time, the exhaust port is opened to only a small extent as shown in FIG. 6.

When the linear solenoid valve is used for controlling line pressure in the hydraulic control device of an automatic transmission, and when the throttle opening is zero in the high speed stage of D range and Lock-up OFF, or when the output pressure from the linear solenoid valve is not necessary, as when the vehicle is halted such as in P range, the decision means decides to operate the foreign discharging control means. This decision sends a fixed electric signal to the electromagnet to move the spool beyond the usual control range to open wide the exhaust port. The foreign matter collected in the exhaust port is then discharged with a small quantity of oil.

BRIEF DESCRIPTION OF THE DRAWINGS

The above and other objects and advantages of the present invention will become clear from the following description with reference to the accompanying drawings, wherein.

DESCRIPTION OF THE PREFERRED EMBODIMENTS

Figure 1:
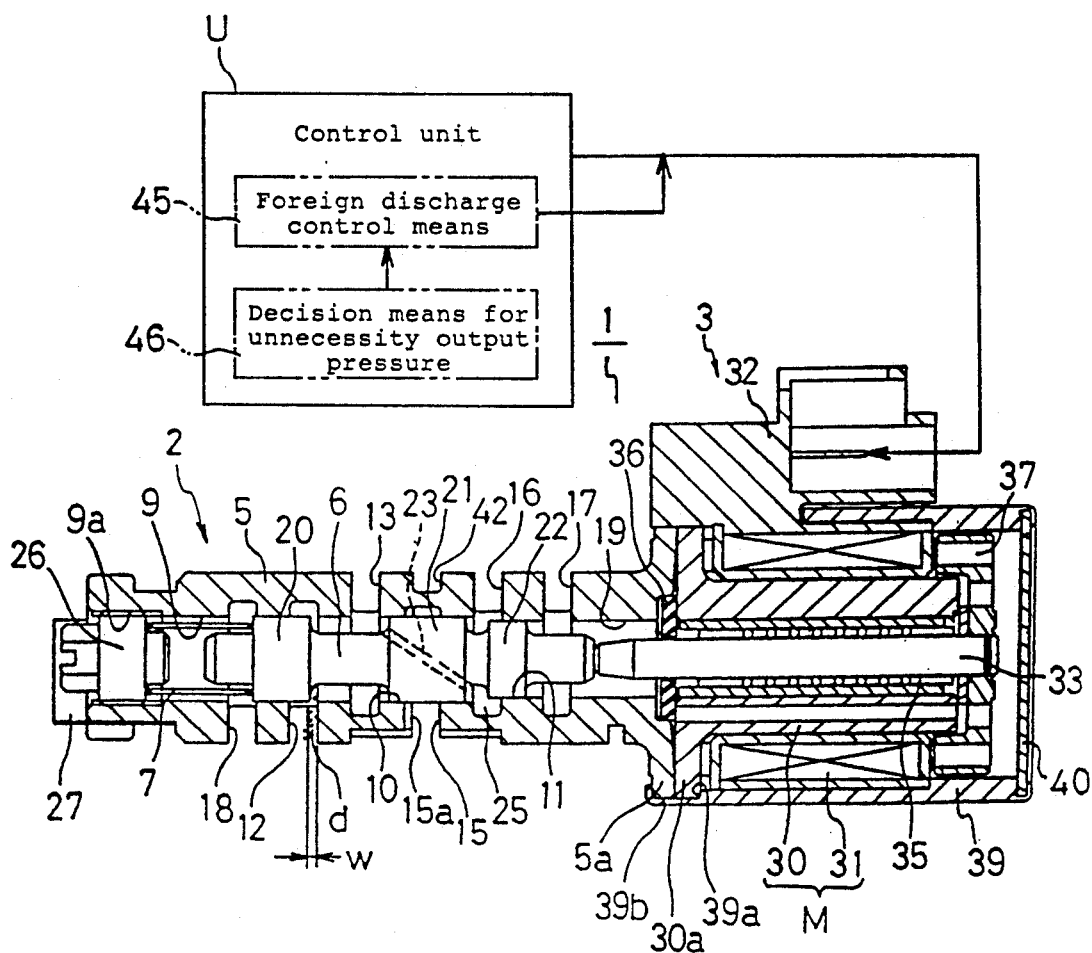
FIG. 1 is a cross-sectional view of the linear solenoid valve apparatus of the present invention.
Figure 2:
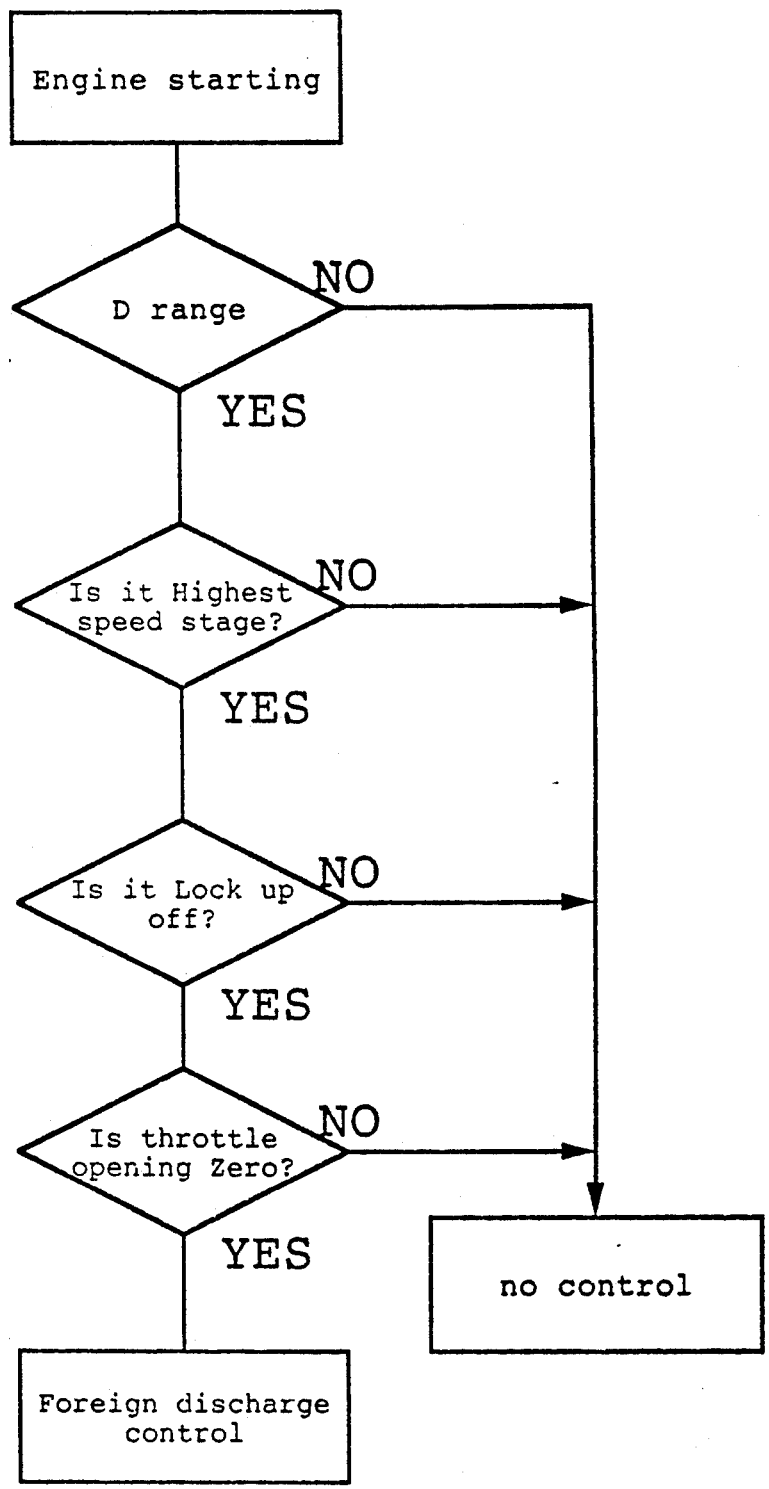
FIG. 2 is a flow chart showing the foreign discharging control.

With reference to the drawings, a linear solenoid valve 1, as shown in FIG. 1 and 2, has a modulator valve 2 and an electromagnetic valve 3. The modulator valve 2 includes a valve sleeve 5 and a spool 6. The valve sleeve 5 has a hole therein for housing the spring 7 and a large size guide hole 11 therethrough. The valve sleeve 5, has a radially extending exhaust port 12, an output port 13, and a supply port 15. Circumferential conduits or grooves are formed around the guide holes in communication with these ports.

The supply port 15 has a notch 15a for preventing oil fluid pressure vibration and for regulating the supply pressure to a fixed output pressure by restricting fluid passage through the spool as described below.

A feedback chamber 16 defined by spool lands is closed so as not to connect to any passage.

An open passage 17 is for exhausting oil pressure from a chamber 19, and 18 is a radial opening for spring hole 9.

Spool 6 has two lands 20 and 21 disposed slidably in the large size guide hole 10, and a land 22 disposed slidably in the small size guide hole 11.

One of the large size lands 21 has an oil hole 23 for feedback pressure therethrough and the other of the large size lands 20 restricts flow between the output port 13 and exhaust port 12, thus preventing an output fluid pressure from exceeding a fixed value.

Another of the large size lands 21 restricts flow between supply port 15 and an output port 13 for supplying an oil pressure, modulated to correspond to the location of a spool 6 between the supply port 15 and the output port 13, as an output pressure.

The relationship between each port and land is the so-called overlapped type.

Ordinarily, a supply port 15 communicates with output port 13 by a restricted oil pressure.

A feedback chamber 25 is disposed between one of the large size lands 21 and a small size land 22, and is supplied an output fluid pressure through a feedback oil pressure hole 23 which serves as a feedback pressure against the force of a spring 7. The valve sleeve 5 has a screw 9a at the end of hole 9, in which an adjusting bolt 26 is engaged.

A coil spring 7 is provided between the adjusting bolt 26 and the projection 6 and the spring force is adjusted corresponding to the rotation of the bolt 26.

Furthermore, the valve sleeve has an engaging means 27 fixing the bolt 26 at a fixed position in the sleeve.

The valve sleeve 5 has a flange 5a extending radially at the front end thereof, through which modulator valve 2 is fixed to an electromagnetic valve 3.

On the other hand, an electromagnetic valve 3 has a cylindrical core 30 and an electromagnetic coil assembly 31 disposed around the core 30 which form an electromagnetic M to which an electric current is supplied through a connector 32.

Furthermore, core 30 has a flange 30a at the end near the modulator valve.

A push rod 33 is supported slidably in the center hole of the core 30 through a linear type roller bearing. One end of the 15 push rod 33 contacts spool 6 of the modulator valve and is supported by elastomeric member 36 (FIG. 1) disposed between flanges 5a and 30a of valve sleeve 5 and core 30, respectively. The opposite end of the push rod 33 has a plunger 37 fixed thereto, which can be axially moved by electromagnet M. Accordingly, the push rod 33 moves with the plunger 37 integrally and substantially as part of the plunger.

The valve sleeve 5, has an output port 13, a port 16 for a feedback pressure channel 25, an upper side open port 17 for chamber 19 and an open port 18 for spring hole 9, an exhaust port 12, and a lower side supply port 15.

The valve sleeve 5 is mounted in the lower portion of a valve body (not shown in the drawings). The output port 13 opens upwardly and the exhaust port 12 and the supply port 15 open downwardly.

Furthermore, the valve sleeve 5 has a groove 42 extending partially around its outer circumference in communication with the supply port 15. The oil supplied from the supply passage formed in the lower portion of the valve body is supplied from the supply port 15 to the spool 6 via groove or conduit 42. This structure prevents the spool 6 from sticking due to the presence of foreign matter such as steel powder.

The connector 32 of the electromagnetic valve 3 is electrically connected to the control unit U, from which electric current is sent to the electromagnetic valve 3.

The control unit U has a foreign matter discharging control means 45 and an output pressure need decision means 46. When a condition dictating lack of need for output pressure is decided by the decision means, the foreign discharging control means supplies an electric current different from that of the usual control condition. By this operation, the plunger 37 is moved substantially and the land 20 of the spool 6 opens the exhaust port wide.

The makeup of the foreign discharging control means and the output pressure need decision means is described below.

The operation of the linear solenoid valve apparatus of this embodiment is explained for the case of application as a linear pressure control device of an automatic transmission. When supplying a supply pressure from an oil pump to a supply port 15, a fixed electric current is supplied from the control unit U to an electromagnetic coil assembly 31. Then, a load "F", which is loaded to the left side of a spool 6 through a pushing rod 33 by pulling plunger 37, is applied by the engaged electromagnet "M". A biasing force "Fsp" of a spring 7 is applied to the right side of spool 6, and the oil pressure in feedback chamber 25, that is, an output pressure "P" (P (A1−A2)) operated between a large size land 21 (area A1) and small size land 22 (area A2), urges spool 6 to the left. The pulling force "F" on plunger 37 is balanced against the oil pressure P (A1−A2). That is, $$F = Fsp - (A1 - A2) P.$$

Accordingly, $$P = (Fsp - F)/(A1 - A2).$$

A pressure supplied to supply port 15 is regulated so as to increase when the pulling force "F" on plunger 37 is large and is supplied from the output port 15 to a modulating port (not shown in figure) of a primary regulator valve.

Figure 5:
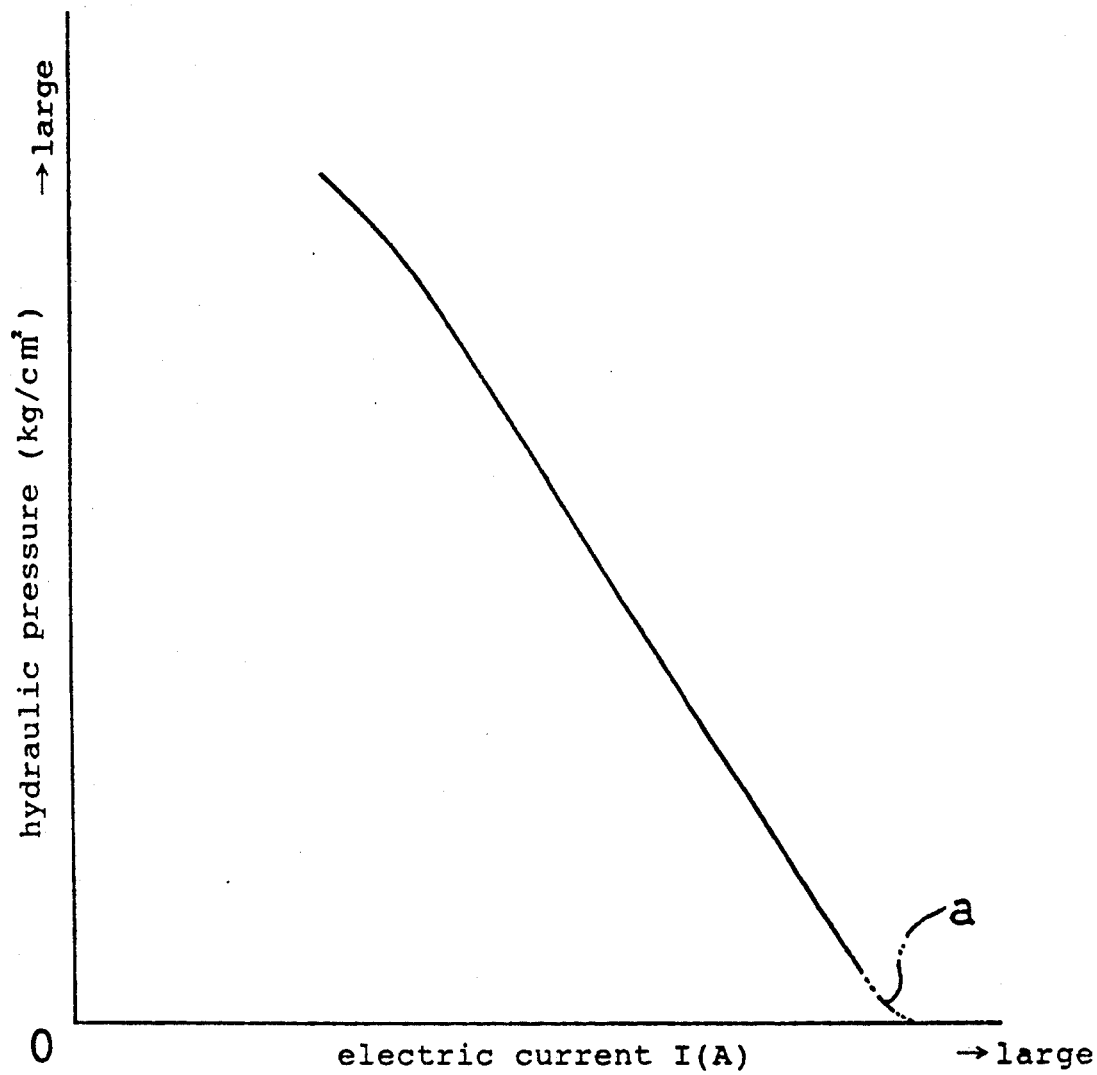
FIG. 5 is a graph showing the relationship between the output pressure of the linear solenoid valve and the supplied electric current.

As shown in FIG. 5 the supplied electric current is proportional to the output pressure so that output pressure "P" becomes smaller as the supplied electric current becomes larger, because plunger pulling force "F" becomes higher as the electric current supplied to the electromagnet 3 increases.

A linear solenoid valve 1 supplies a higher output pressure as the input electric current becomes lower (high→low), and, accordingly, a high linear pressure is supplied.

In order to lower the output pressure, the output port 13 is disconnected from the supply port 15, and the output port 13 is connected to the exhaust port 12 by moving the spool 6.

But, in the control described above, the open area of the exhaust port as shown in FIG. 1, is very small within the usual electric current range such as 0.95A and the output pressure does not become zero, as shown in FIG. 5. Accordingly, under this usual condition, when oil mixed foreign matter enters the supply port and travels to the output port, the heavy foreign matter is collected at the output port because the oil flows upwardly to exit at the output port. The foreign matter is not discharged because the opening 3 is very small even if the exhaust port is opened.

With the engine started, that is, under vehicle driving conditions, as shown in FIG. 2, when the shift lever is located in D-range and the shift stage is set to the highest speed stage such as 4th speed or 5th speed, the lock-up clutch is disengaged, and the throttle opening is zero, the foreign matter discharging control means of the present invention is operative. That is, since these conditions provide coasting in D-range driving, the clutch engagement pressure is sufficient even if the pressure is low. Therefore, the line pressure is at its lowest.

Figure 3:
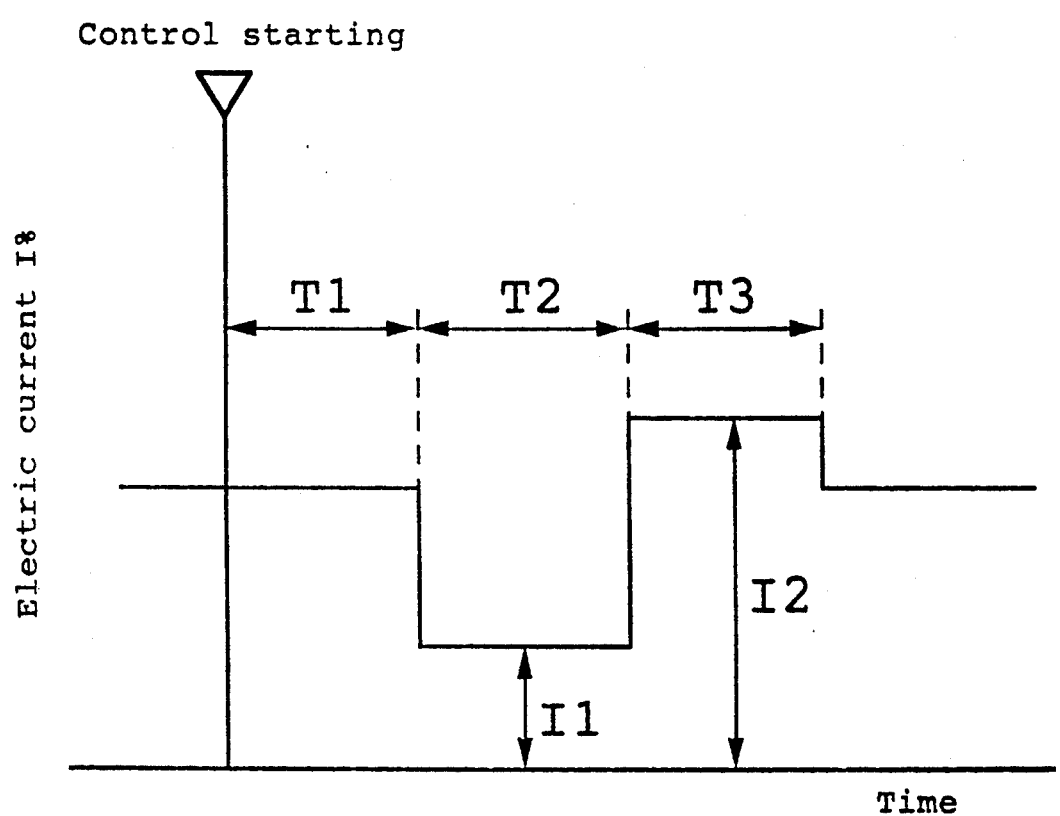
FIG. 3 is a time graph.
Figure 6:
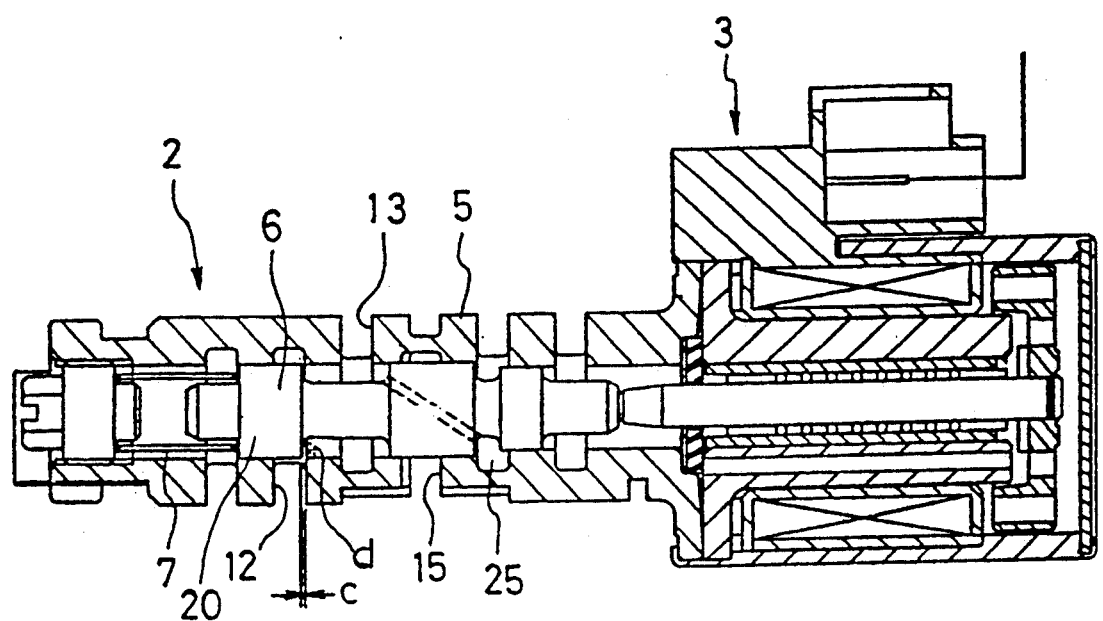
FIG. 6 is a cross-sectional view of the linear solenoid valve apparatus of the present invention.

When the foreign matter discharge control, as shown in FIG. 3, is started, the electric current I is decreased to the fixed low electric current $I_1$ (for example about 50% of fixed standard), after the usual control is on for a time $T_1$ (msec). After the fixed electric current condition is kept for a time $T_2$ (msec), the electric current increases 1A (for example) and this condition is kept for a fixed time $T_3$ (msec). Then, the spool 6, based on the above described low electric current $I_1$, is moved to the right, that is, to increase the output pressure. Thereafter, the spool 6 is moved suddenly to the left responsive to the electric current $I_2$ and opens wide (W) the exhaust port 12 by operation of inertia as shown in FIG. 6. Under this condition, the foreign matter collected in the port is immediately discharged with the exhaust oil. After a fixed time $T_3$, the usual condition is resumed.

The foreign matter discharging control may be operated repeatedly and continuously during the above described condition, until (1) the shift position is set to other than D-range, (2) the shift is changed to the down shift from the highest speed stage, (3) the lock-up clutch is engaged, or (4) the throttle pedal is depressed, or may be performed once.

The output pressure of the linear solenoid valve 1, as shown in FIG. 5, becomes zero while discharging foreign matter (solid line). Even if the output pressure becomes zero, the line pressure can't become zero due to the primary regulator valve and the fixed value of the line pressure is maintained.

Figure 4:
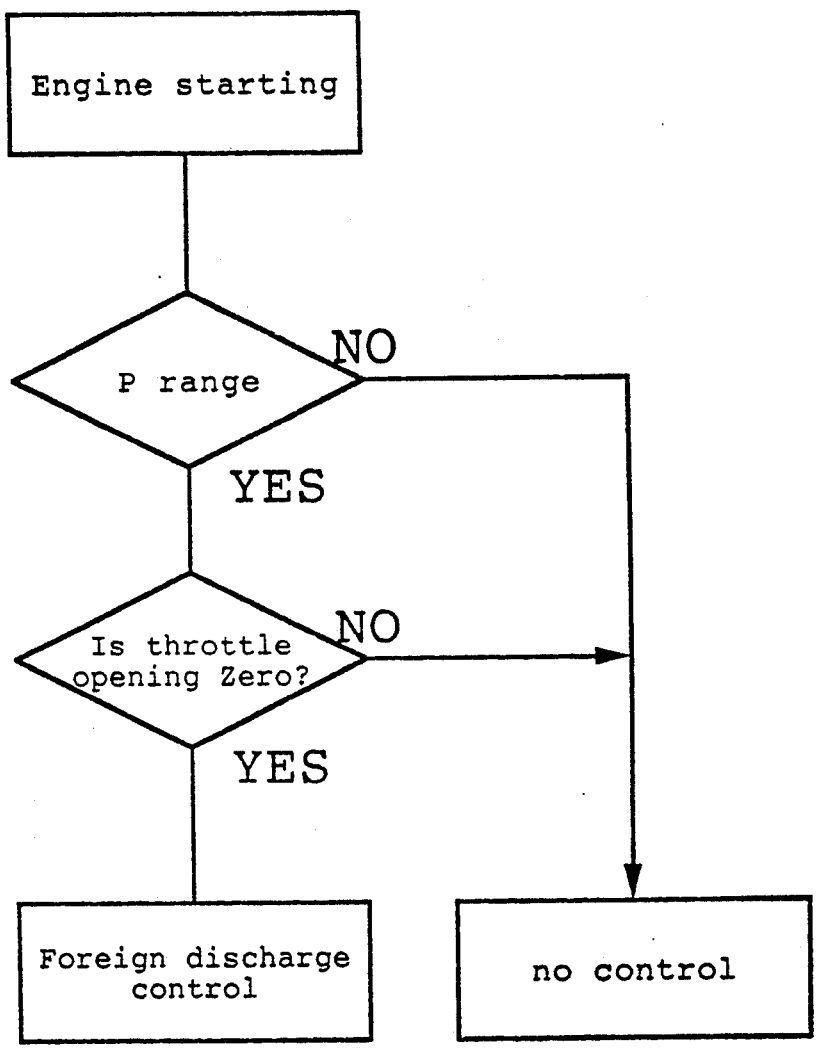
FIG. 4 is a flow chart showing another embodiment of the foreign discharging control.

According to the above described embodiment, the usual control utilizes 95% of the fixed standard, and the foreign matter discharging control is established by supplying 100% electric current of the fixed standard. That is, all the control is performed within the fixed standard. In another embodiment, the usual control is performed within 100% of the fixed standard and the foreign matter discharge control is performed above 100% of the fixed standard for electric current. This partially changed embodiment is illustrated in FIG. 4. When the shift range P (parking range) is selected and the throttle opening is set to zero during engine starting, or when the vehicle is halted and the line pressure is at its lowest, the foreign matter discharging control is performed. Only one operation for discharging foreign matter is performed responsive to detection of the vehicle halting and may be performed only once during engine starting.

The foreign matter discharging control during driving as shown in FIG. 2 and/or during vehicle halting as shown in FIG. 4 may be made used.

As in the above description, the overlapped type linear solenoid valve keeps the oil pressure stable and saves consumption of oil.

Thus, a very simple system utilizing merely a different electric signal from that usually supplied to the electromagnetic valve, can discharge the foreign matter collected in the exhaust port, prevent valves from sticking and improve the reliability of the linear solenoid valve.

We claim:

1. A linear solenoid valve apparatus comprising:
an overlapped type linear solenoid valve including:
 a valve sleeve having:
  a supply port;
  an output port;
  an exhaust port, said exhaust port normally opening only to a limited extent whereby any foreign matter in oil flowing to the exhaust port is trapped within the valve; and
  a feedback chamber;
 a spool slidably mounted in the valve sleeve;
 a spring biasing the spool in one direction; and
 an electromagnet for moving said spool; and
control means for supplying a first electric signal to the electromagnet, said control means including deciding means for deciding when an output pressure from the solenoid valve is not necessary; and
foreign matter discharging control means for sending a second electric signal, different from said first electric signal, to said electromagnet, said electromagnet being responsive to said second signal by moving said spool to open said exhaust port widely, beyond said limited extent, to allow discharge of the trapped foreign matter.

2. The linear solenoid valve apparatus of claim 1 wherein said exhaust port opens radially downward.

3. A linear solenoid valve apparatus in accordance with claim 1, for installation in a vehicle as a hydraulic control device, wherein said foreign matter control means sends said second signal responsive to the starting of the vehicle.

4. The linear solenoid valve apparatus in accordance with claim 1, for installation in a vehicle as a hydraulic control device, wherein said foreign matter control means sends said second signal responsive to the halting of the vehicle.

* * * * *